G. RISCHMULLER.
TURBINE.
APPLICATION FILED JULY 23, 1919.

1,362,963.

Patented Dec. 21, 1920.
3 SHEETS—SHEET 1.

Witness
Chas. L. Griesbauer

Inventor
George Rischmuller,
W. Schornborn, Attorney
—by

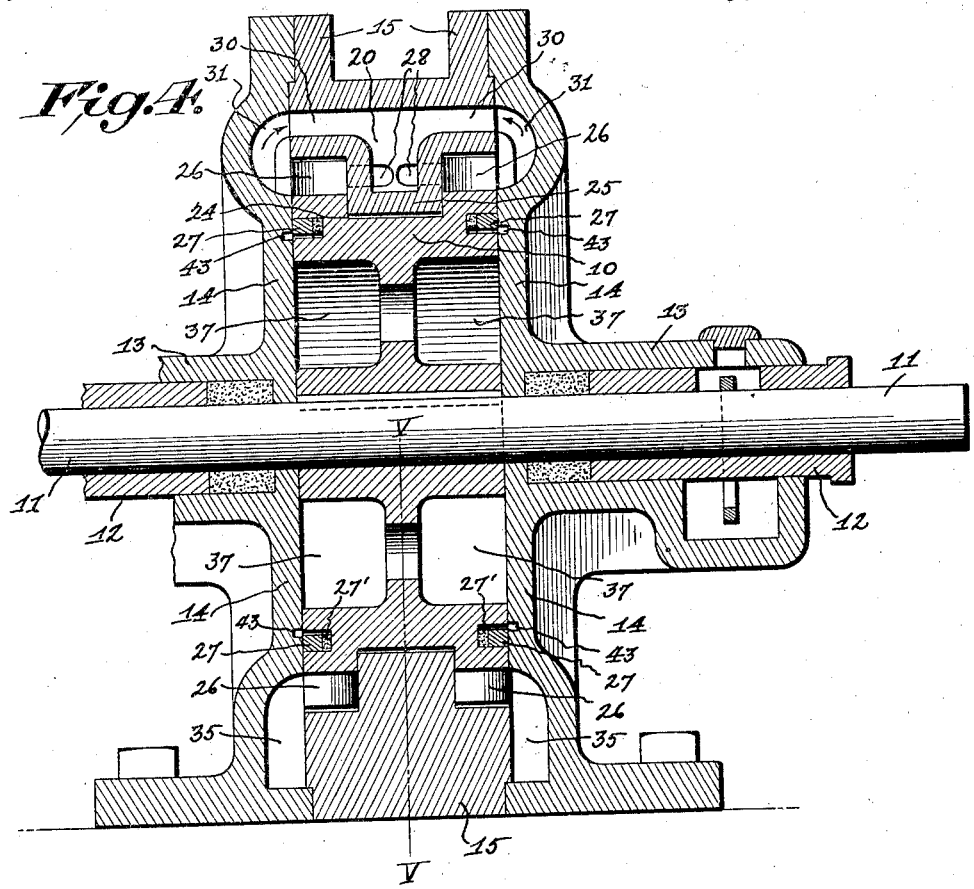
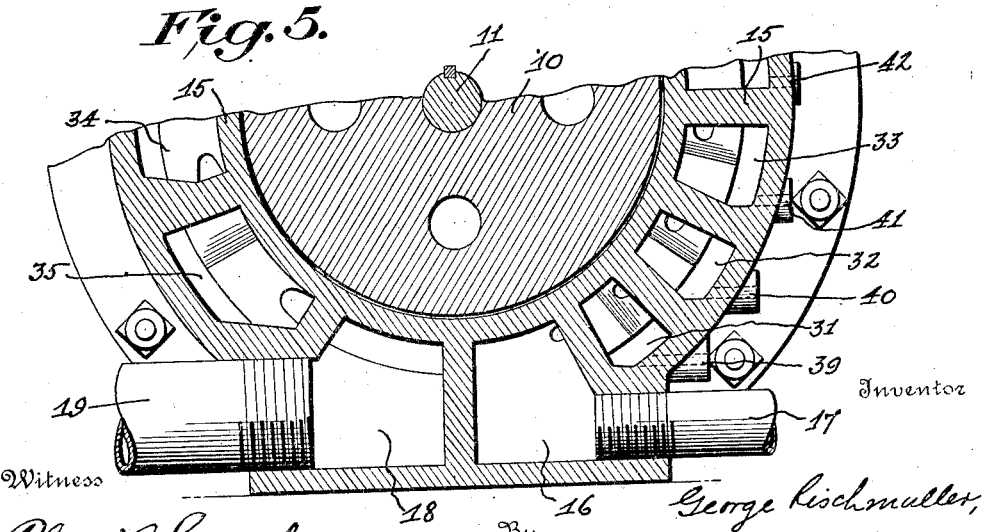

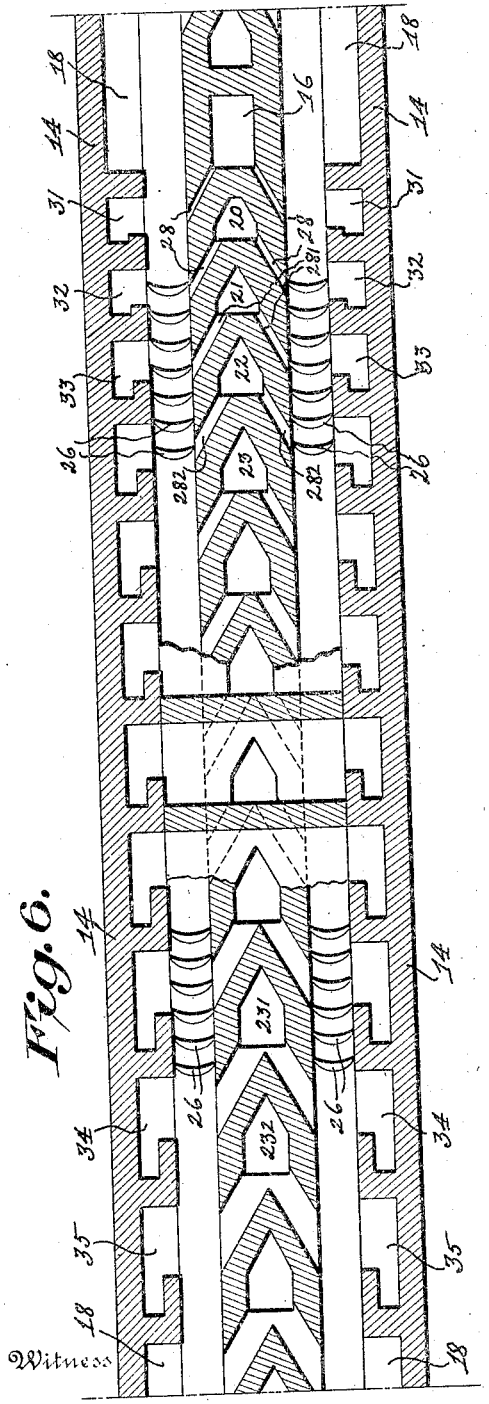
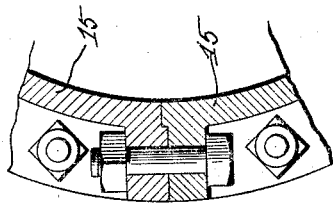
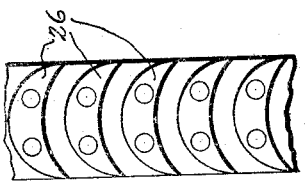
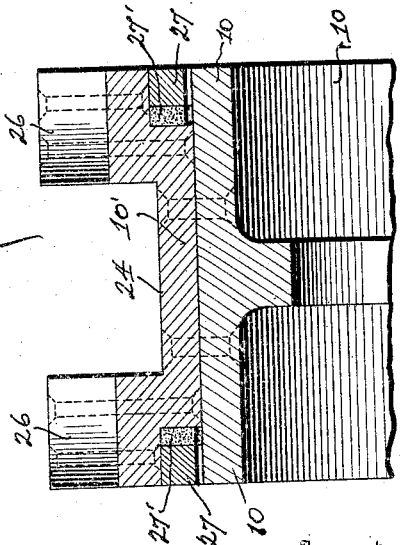

UNITED STATES PATENT OFFICE.

GEORGE RISCHMULLER, OF SAN FRANCISCO, CALIFORNIA.

TURBINE.

1,362,963.  Specification of Letters Patent.  Patented Dec. 21, 1920.

Application filed July 23, 1919. Serial No. 312,775.

*To all whom it may concern:*

Be it known that I, GEORGE RISCHMULLER, a citizen of the United States, residing at San Francisco, in the county of San Francisco and State of California, have invented certain new and useful Improvements in Turbines, of which the following is a specification.

This invention relates to improvements in elastic fluid turbines, the object of this invention being, first, to provide a turbine in which the pressure on the sides of the movable member shall be evenly balanced, thereby avoiding any vibration or undue friction; second, to provide a turbine in which a better control of the direction and pressure of the motive fluid is effected than in the usual types of turbines and with greater economy in the use of steam; and third, to provide a turbine which is as small and compact as possible and which therefore may be constructed at a minimum of cost.

Other objects of my invention will manifest themselves and will be fully understood by the detailed description and mode of operation to be hereinafter given.

My invention consists of structural characteristics and relative arrangement of elements which will be hereinafter more fully disclosed and particularly pointed out in the appended claims.

In the accompanying drawings,

Fig. 4 is an enlarged vertical longitudinal section taken along the line IV—IV of Fig. 1;

Fig. 5 is a broken transverse sectional view taken along the line V—V of Fig. 4;

Fig. 6 is a projected sectional view showing the relative position of the rotor blades, coöperating nozzle, steam chests and exhaust chambers;

Fig. 7 is an enlarged sectional view of a peripheral portion of the rotor with its blades;

Fig. 8 is a top view of a portion of one of the series of blades provided on the periphery of the rotor; and Fig. 9 is a sectional view, showing how the upper and lower sections of the central member of the casing are fastened together.

Similar characters of reference designate corresponding parts throughout the several views.

Figure 1:
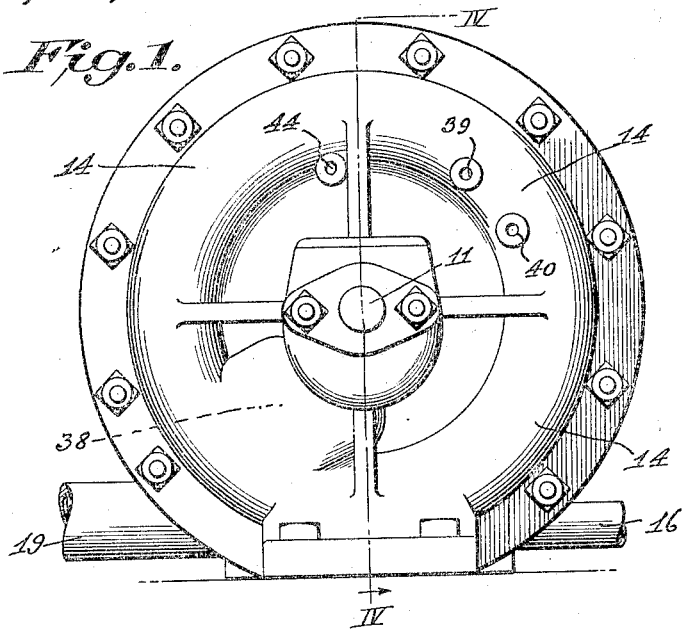
Figure 1 is a side elevation of a turbine constructed according to my invention.

In the drawings, 10 designates the wheel disk member or rotor, adapted to rotate with the power transmitting shaft 11 journaled in suitable bearings 12 supported by extensions 13 of the duplicate turbine casing sections or heads 14. Bolted to and between the two casing sections 14 is the divided annular section 15, which is bisected by the medial plane of the turbine shaft taken perpendicularly to the axis of the shaft. In the annular section, at its base, is provided an annular inlet chamber 16, into which the live elastic motive fluid, such as steam, enters by a pipe 17, and an oppositely disposed adjacent annular final exhaust chamber 18 from which leads the exhaust pipe 19. Above the chambers 16 and 18 in the annular sections and bisected by said medial plane are located, as indicated in Fig. 6, a series of fluid chambers or steam chests 20, 21, 22, 23, 231, 232, etc., which are of uniform width, but gradually increase in peripheral length from the chamber 16 toward the exhaust chamber 18 to accommodate the expansion of the motive fluid as is usual in this type of motors.

The rotor 10 is preferably made with a separate rim section 10′ provided with a central peripheral depression or groove 24 into which the portion 25 of the annular section 15 projects. To the rotor section 10′ on either side of the groove 24 are fastened the crescent shaped blades 26, these thus forming two symmetrically disposed peripheral series of buckets. Said blades 26 are preferably made of drawn steel and suitably riveted to the periphery of the rotor 10, as shown for example in Figs. 7 and 8. An annular groove on each side of the rotor is fitted with a suitable metallic packing ring 27, preferably of bronze, which rings bear against the casing sections 14 and are backed up or forced out by any suitable fibrous or elastic material 27′, thus making a fluid-tight joint between the rotor 10 and casing sections 14.

Leading from each of the steam chests 20, 21, etc., are two symmetrically disposed and substantially straight nozzles 28, 281, 282, etc., parallel with the peripheral surface of the rotor and so disposed as to properly and efficiently guide the motive fluid against the curved surfaces of the blades 26. The nozzles 28 are simply drilled in the metal and therefore inexpensive in their manufacture.

Each of the casing sections or heads 14 is provided with a series of exhaust chambers 31, 32, 33, 34, 35, etc., which receive the motive fluid after it has passed through the intervening spaces or buckets between the blades 26 of the rotor 10. The said exhaust chambers and nozzles are symmetrically located with respect to the medial plane above referred to.

The course of the motive fluid is as follows:

Arriving in a steam chest 20, the motive fluid is evenly divided into two equal streams which are led through respective nozzles or ports 28, against blades 26 and thus evenly balance the oppositely exerted pressure on the rotor and thereby effectively diminish or prevent lateral vibration thereof. From the bucket formed between adjacent blades 26 the motive fluid enters the exhaust chamber 32, which is larger than the corresponding one 31, to provide for the expansion of the motive fluid, and is led to the next succeeding steam chest 21, which is nearer to the final exhaust than steam chest 20, from whence nozzles 281, larger in cross-section than nozzles 28 lead the fluid to the bucket of the corresponding blade, thence to the exhaust 33 and so on around until the final exhaust 35 is reached.

As shown in Fig. 6, there is a gradual increase in the peripheral lengths of the exhaust chambers and steam chests and of the size of the nozzles from the inlet to the exhaust end of the turbine to accommodate the expanding motive fluid.

Figure 3:
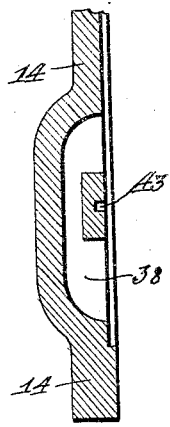
Fig. 3 is a fragmentary section taken along the line III—III of Fig. 2.
Figure 2:
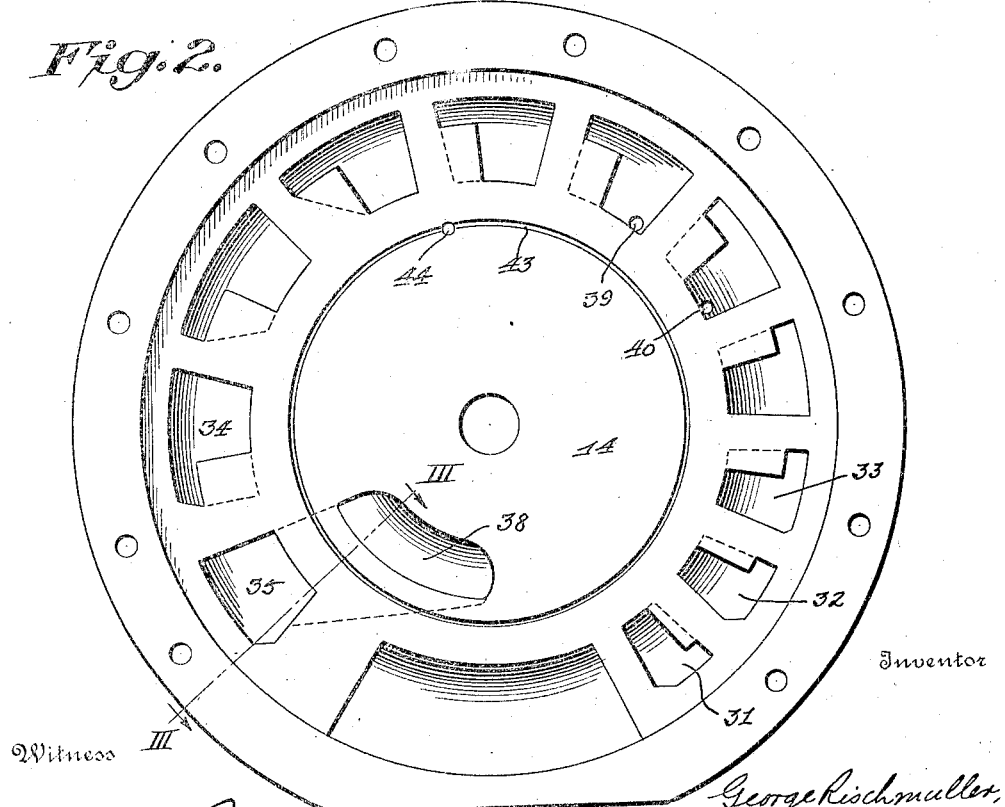
Fig. 2 is an enlarged end view of the interior of one of the casing members.

Any motive fluid or steam that may leak past the packing ring 27 between the rotor 10 and casing heads 14 will find its way finally into the collecting chambers 37 and be led from thence by means of passageway 38, see Figs. 2 and 3, to the final exhaust chamber 35 to be utilized together with the motive fluid passing through the next to the last pair of nozzles into said final exhaust chamber by being passed from thence into the final steam chest and final directing nozzles onto a portion of said blades.

Any water of condensation which may accumulate in any of the exhaust chambers 31, 32, 33, etc., may be drained off through the corresponding drain openings 39, 40, 41, 42, etc., which are provided with suitable petcocks, not shown, but which are well-known and need no further disclosure.

Each of the casing sections 14 is also provided with an annular groove 43, adjacent the packing ring 27, to which groove oil may be supplied through the opening 44, by means of any suitable device.

The course of the motive fluid in my turbine, taking steam for instance, and referring particularly to Figs. 4 and 6, is now as follows:

Live steam is passed through the pipe 17 into inlet chamber 16 and then through two nozzles 28 between the blades into the first exhaust chambers 31 on either side. It is now directed inwardly and horizontally from each chamber 31 into the outer portion of the first steam chest 20 and then centrally and toward the axis of the rotor into the inner portion of the chest 20 and finally forwardly where the current of steam is divided equally and directed horizontally, laterally and divergently through the nozzles 28 against the oppositely disposed sets of blades 26. Passing these outwardly into the next succeeding exhaust chamber 32, the steam passes up and across into the next succeeding steam chest 21, then toward the axis of the rotor and centrally into the portion thereof where it divides, and passes through the next pair of nozzles 28 to the corresponding blades 26, of the rotor, and is then exhausted into chamber 33, and so on until the final exhaust chamber 18 is reached, when the finally exhausted steam passes out through the pipe 19 to any suitable condenser not shown.

From the foregoing disclosure of the construction, arrangement and operation of the invention, it will be seen that I have devised a turbine which is simple and all the parts are easily manufactured, inspected and adjusted or repaired and requires no skilled mechanic to install the same or special machinery or castings to make the several parts.

It is obvious that various other forms and modifications may be made and used without departing from the essential features and principles of my invention and I do not wish to be understood as limiting myself to the specific and preferred construction herein shown and described.

What I claim is:—

1. In an elastic fluid turbine, two fixed complementary casing heads provided with exhaust chambers and a final exhaust outlet, an annular fixed casing member located between said casing heads and forming therewith an inclosed chamber, a rotor fitted within said chamber and having an annular central groove and a series of blades on each side thereof, the annular member having a live steam inlet, a series of centrally disposed steam chests and a pair of directing nozzles leading outwardly from the forward end of each steam chest, each nozzle of the pair being adapted to simultaneously direct an equal quantity of the motive fluid at equal pressure against the adjacent portion of the series of blades, so as to equalize the lateral pressure on the rotor.

2. In an elastic fluid turbine, a fixed casing consisting of two head sections and an annular section combined to form an inclosed chamber, said casing having a live steam inlet and a final exhaust outlet, two symmetrically disposed series of exhaust chambers, one series of steam chests, between the latter and a pair of directing nozzles leading from each steam chest, a shaft carrying a rotor fitting within said inclosed chamber, said rotor being provided with two parallel rows of blades, each row being movably located between one of the series of exhaust chambers and the adjacent series of directing nozzles, so that a stream of motive fluid from a pair of exhaust chambers may combine in the corresponding steam chest and then be divided between the pair of nozzles attached to said chest, and directed outwardly against the opposed portions of the two rows of blades, then passing between the blades outwardly into the next succeeding pair of exhaust chambers, then inwardly to the next succeeding steam chest and so on throughout the series from the steam inlet to the final exhaust outlet.

3. In an elastic fluid turbine, complementary casing sections each provided with a series of exhaust chambers, a final exhaust outlet for the combined sections, an annular section forming an inclosed chamber with the casing sections and provided with a live steam inlet, a series of centrally disposed steam chests and two directing nozzles for each chest, a rotor located within said inclosed chamber and carrying a double series of blades, each series of blades being disposed between the series of steam chests and the adjacent series of exhaust chambers, these elements being so arranged that motive fluid may simultaneously pass from each of a pair of complementary exhaust chambers toward a single steam chest and combined therein, thence pass centrally inwardly to the pair of directing nozzles of the said steam chest and then diverge outwardly, so that the fluid leaving each nozzle will impinge against the opposed blades of the rotor, then pass outwardly into the next succeeding pair of exhaust chambers and next steam chest, and so on throughout the series from the steam inlet to the final exhaust outlet.

4. A turbine comprising two casing members provided with a series of exhaust chambers and a final exhaust outlet, an annular member located between the casing members and with them forming an inclosed chamber, a rotary member fitting within said chamber, and provided with two parallel series of peripheral blades on its rim portion, said annular member having a live steam inlet and a series of steam chests in its central portion and passageways to each side of each steam chest leading to corresponding exhaust chambers of the casing members, and said annular member being provided with a series of pairs of directing nozzles directed outwardly toward the two series of blades.

5. In an elastic fluid turbine having a closed casing provided with a live steam inlet and a final exhaust outlet, annular series of exhaust chambers, including a final exhaust chamber, a series of steam chests and directing nozzles, a rotor fitted within said casing and provided with peripheral rows of blades on its rim and collecting chambers located between its rim and center, and a packing provided between said casing and said rotor, a passageway in said casing leading to said final exhaust chamber, these elements being so arranged that any motive fluid leaking past said packing will be collected in said chambers and led into said final exhaust chamber, final steam chest and final directing nozzles to be directed against a portion of said blades.

In testimony whereof I affix my signature.

GEORGE RISCHMULLER.